US012637154B2

(12) United States Patent (10) Patent No.: US 12,637,154 B2
Miettinen (45) Date of Patent: May 26, 2026

(54) TRAILER

(71) Applicant: SLEIPNER FINLAND OY, Jyväskylä (FI)

(72) Inventor: Joona Miettinen, Jyväskylä (FI)

(73) Assignee: SLEIPNER GROUP OY, Jyväskylä (FI)

( * ) Notice: Subject to any disclaimer, the term of this patent is extended or adjusted under 35 U.S.C. 154(b) by 447 days.

(21) Appl. No.: 18/282,195

(22) PCT Filed: Mar. 14, 2022

(86) PCT No.: PCT/FI2022/050164
§ 371 (c)(1),
(2) Date: Sep. 14, 2023

(87) PCT Pub. No.: WO2022/195164
PCT Pub. Date: Sep. 22, 2022

(65) Prior Publication Data
US 2024/0158026 A1 May 16, 2024

(30) Foreign Application Priority Data

Mar. 15, 2021 (FI) ..................................... 20215282

(51) Int. Cl.
*B62D 53/06* (2006.01)
*B60P 1/18* (2006.01)
(Continued)

(52) U.S. Cl.
CPC .............. *B62D 53/062* (2013.01); *B60P 1/18* (2013.01); *B60P 1/435* (2013.01); *B60P 3/062* (2013.01)

(58) Field of Classification Search
CPC .. B60P 1/18; B60P 1/435; B60P 1/003; B60P 1/43; B60P 1/438; B60P 3/062;
(Continued)

(56) References Cited

U.S. PATENT DOCUMENTS 2,530,866 A * 11/1950 Evans .................. B62D 53/065
14/71.1
2,900,094 A * 8/1959 Ferguson .................. B60P 1/43
193/41

(Continued)

OTHER PUBLICATIONS

Panther Series II 80-130 manufactured by Piacentini & Son Pty Ltd (Australia), https://www.youtube.com/watch?v=AdbA3tyg7PM&t=3swhich.

(Continued)

*Primary Examiner* — Amy R Weisberg
*Assistant Examiner* — Veronica M Condo
(74) *Attorney, Agent, or Firm* — FisherBroyles, LLP; Robert Kinberg

(57) ABSTRACT

A trailer includes a frame comprising a front end, a rear end and a vehicle platform for supporting a working machine to be transported on the trailer frame. Wheels support the trailer on a ground surface. At least one loading ramp is attached in an articulated manner to the rear end of the trailer frame by a transverse pivot joint. Each loading ramp is arranged to rest on the ground surface in a loading position for moving the working machine onto the vehicle platform. Each loading ramp) includes a ramp frame having a first end adjacent the rear end of the trailer frame and a second end opposite the first end. A transverse pivot joint is formed in the ramp frame between the first end of the ramp frame and the second end at a distance (d) from the first end of the ramp frame and includes at least one pivot pin and at least one slot which allow a limited inclination of each loading ramp about a longitudinal axis located between the first end of the ramp frame and the second end of the ramp frame. One of either the pivot pin and the slot is formed in the ramp frame and the other of the pivot pin and the slot is formed in the rear end of the trailer frame.

11 Claims, 12 Drawing Sheets

(51) Int. Cl.
  *B60P 1/43*     (2006.01)
  *B60P 3/06*     (2006.01)
(58) Field of Classification Search
  CPC .... B60P 3/06; B60P 3/08; B60P 3/064; B60P
                3/066; B60P 3/07; B60P 3/071; B60P
                3/12; B60P 3/122; B62D 53/062; B62D
                53/064; B62D 53/065; B62D 33/02;
                B65G 69/2864; B65G 67/02; B60R
                                                    19/482961
  See application file for complete search history.

(56)            References Cited

U.S. PATENT DOCUMENTS 3,138,272 A * 6/1964 Flowers ................... B60P 1/43
                                                        414/537
  3,424,323 A * 1/1969 Barnaby .................. B60P 1/43
                                                        14/71.1
  3,834,565 A * 9/1974 Goodman, Jr. .......... B60P 1/43
                                                        296/61
  3,866,771 A * 2/1975 Reid ........................ B60P 1/43
                                                        296/61
  4,020,957 A * 5/1977 Wren ....................... B60P 3/07
                                                        296/61
  4,144,979 A * 3/1979 Leach, Jr. ............ B62D 63/061
                                                        14/71.1
  4,498,836 A *  2/1985 Love ....................... B60P 1/433
                                                        14/71.3
  5,137,414 A *  8/1992 Sloan ...................... B60P 3/07
                                                        414/483
  6,113,338 A *  9/2000 Smith ...................... B60P 1/43
                                                        414/812
  6,394,734 B1 * 5/2002 Landoll ................... B60P 3/062
                                                        293/118
  6,767,172 B2 * 7/2004 French ..................... B60P 1/43
                                                        414/481
  8,375,496 B1 * 2/2013 Johnson ................. A61G 3/067
                                                        14/71.3
  9,656,588 B2 * 5/2017 Robertson ................ B60P 3/06
  9,669,749 B2 * 6/2017 Walker .................. B60P 1/4421
  9,862,298 B2 * 1/2018 Bushek .................... B60P 1/43
  2004/0052625 A1 * 3/2004 Butterfield ............. B60P 1/435
                                                        414/537
  2011/0099780 A1 * 5/2011 Schneider ........... B62D 53/065
                                                        29/401.1
  2019/0092209 A1 * 3/2019 Friesen .................. B60P 1/438

OTHER PUBLICATIONS

International Search Report in corresponding International Patent
Application No. PCT/FI2022/050164, mailed Jun. 23, 2022, 4
pages.

* cited by examiner

SECTION A-A

SECTION A-A

Fig. 5a          SECTION H-H

SECTION B-B

SECTION C-C

TRAILER

CROSS-REFERENCE TO RELATED APPLICATIONS

This application claims benefit of priority from International Patent Application No: PCT/FI2022/050164 filed Mar. 14, 2022, which claims benefit of Finland Patent Application No. 20215282, the contents of the PCT application being incorporated herein by reference in its entirety.

FIELD OF THE INVENTION

The invention relates to a trailer, which includes
a frame comprising a front end and a rear end, as well as a vehicle platform for supporting a working machine to be transported on the frame,
wheels for supporting the trailer on a ground surface,
at least one loading ramp attached in an articulated manner to the rear end of the frame by means of a transverse pivot joint, wherein each loading ramp is arranged to rest on the ground surface in a loading position in order to move the working machine onto the vehicle platform, wherein each loading ramp includes a ramp frame, a first end on the side of the frame of the trailer and a second end opposite the first, and
means for operating the loading ramp.

BACKGROUND OF THE INVENTION

In mines and quarries, heavy working machines equipped with tracked chassis or rolling chassis are mainly conveyed from site to site by means of trailers in order to prevent wear on tracked chassis and in order to expedite such movements. As working machines are often large and heavy, with weights of, for example, 120 t, the trailers are also often quite large in size.

A trailer manufactured by an American company called TowHaul Corporation with the product designation RLD-100 is known in the prior art, which includes a frame, wheels attached in an articulated manner to the side of the frame by means of a linkage mechanism, a vehicle platform formed on the frame for the working machine to be conveyed as well as a loading ramp which forms part of the end of the vehicle platform. By means of the linkage mechanism, the rear end of the vehicle platform can be lowered so as to almost touch the ground surface and the loading ramp is positioned on the ground surface in order to load the working machine onto the vehicle platform. The vehicle platform in this trailer is a one-piece vehicle platform that is almost as wide as the entire trailer. The weight of the loading ramp is very high, which increases the power required for towing the trailer as well as the manufacturing costs of the trailer. If the trailer is used on an uneven ground surface where only one edge of the loading ramp rests on the ground surface during loading, both the transverse pivot joint that attaches the loading ramp to the trailer and the loading ramp are subjected to powerful stresses. The stresses can damage the transverse pivot joint or warp the loading ramp.

Also known in the prior art is the trailer with the product designation Panther Series II 80-130 manufactured by Piacentini & Son Pty Ltd (Australia), which has a loading ramp attached in an articulated manner at one end, which rests by the force of gravity in the transport position. This trailer is accordingly also affected by the problem of powerful stresses acting on the transverse pivot joint during loading on an uneven surface.

SUMMARY OF THE INVENTION

The object of the invention is to provide a trailer for heavy working machines that is lighter, more robust and more economical in terms of its manufacturing costs than the trailers of the prior art. The present invention is characterized by a trailer which includes a frame comprising a front end and a rear end, as well as a vehicle platform for supporting a working machine to be transported on the frame, wheels for supporting the trailer on a ground surface, at least one loading ramp attached in an articulated manner by means of a transverse pivot joint to the rear end of the frame and means for operating the loading ramp. Each loading ramp is arranged to rest on the ground surface in a loading position in order to move the working machine onto the vehicle platform. Each loading ramp includes a ramp frame, a first end on the side of the frame of the trailer and a second end opposite the first. The transverse pivot joint is formed in the ramp between the first end and the second end frame at a distance from the first end and includes at least one axle pin and at least one slot, which allows a limited inclination of each loading ramp about a longitudinal axis between the first end and the second end, wherein one of either said pivot pin or said slot is formed in the ramp frame and the other is formed in the rear end of the frame of the trailer.

In the trailer according to the invention, the use of slots in connection with the transverse pivot joint allows the loading ramps to "float" and be positioned according to any unevenness of the ground surface such that, even on a sloping ground surface, the second end of the loading ramp is positioned substantially parallel to the ground surface. The transverse pivot joint and the structure of the loading ramp are consequently not subjected to comparable torsional loads during the transfer of the working machine onto the trailer.

The rear end of the frame of the trailer frame preferably includes beams to which the loading ramp is attached in an articulated manner by means of the transverse pivot joint. The frame of a loading ramp realized with such beams can be narrower compared to a potential alternate realization in which the beams are formed in the loading ramp and the rear end of the frame lies between the beams of the loading ramp. The beams can also be referred to as support arms.

There are preferably two loading ramps, wherein each loading ramp is arranged between two beams. The total weight of a trailer realized with two loading ramps is lower than when a single wide loading ramp is used. Moreover, when two ramps are used, the inclination of an individual ramp unit is smaller in magnitude than the inclination of a one-piece ramp unit, whereby a smaller slot is required.

Preferably, the beams are extensions of the frame of the trailer. They are thereby very rigid, easy to manufacture and a separate attachment of the same is not required.

Preferably, each transverse pivot joint has two pivot pins, which are respectively attached to a beam, and two slots, which are respectively formed in the ramp frame. The structure of the loading ramp is thereby easier to maintain than an alternative embodiment in which the pivot pins form part of the ramp frame and the slots are formed in the beams.

Preferably, the rear end of the frame of the trailer includes a support surface which can be formed underneath the vehicle platform, wherein the first end of each ramp frame rests against the support surface in order to limit a rotation of the ramp frame. The loading ramp can thus rest against the vehicle platform in the transport position and cannot rotate relative to the transverse pivot joint so as to cause the second end to drag on the ground. In other words, the loading ramp according to the invention can be realized entirely without actuators, as the loading ramp is lowered by the force of gravity from the loading position to the transport position, in which it rests against the support surface in order to prevent a rotation that is too large.

Preferably, the support surface is formed by a plate or plates which can be attached to the rear end of the frame of the trailer underneath the vehicle platform, wherein the distance of the second end of the ramp in relation to the ground surface in the transport position of the trailer can be modified by varying the number of plates. It is especially important that the second end of the ramp should not dig into the ground surface when the trailer is being reversed, which could cause damage to the ramp or ramps.

The first end of the ramp frame can include a limiting member which is arranged to rest against the support surface in order to limit the rotation of the loading ramp around the transverse pivot joint. When a limiting member is used, the ramp frame does not have to extend overall as far in the direction of the vehicle platform of the trailer, as only the limiting member extends underneath the vehicle platform so as to rest against the support surface. This reduces the overall weight of the trailer.

Preferably, the distance of the transverse pivot joint from the first end of the ramp frame is 10-40%, preferably 20-30%, of the length of the ramp frame. The centre of gravity of the loading ramp can thereby be located on the side of the second end so that the loading ramp rotates by the force of gravity into the transport position.

Preferably, the centre of gravity of each loading ramp is arranged in a part of the loading ramp on the side of the second end of the ramp frame relative to the transverse pivot joint. In other words, the loading ramp is free to rotate relative to the transverse pivot joint according to the forces affecting it in each situation. In a transport situation, the centre of gravity tends to rotate the loading ramp until the support point of the frame provides a counterforce, which supports the loading ramp in the transport position. In a loading situation, on the other hand, the loading ramp rests on the ground and is able to rotate relative to the transverse pivot joint so as to find the optimal position for loading, in which the loading ramp rests on the ground surface.

The width of the slot can be 3-40 mm larger than the diameter of the axle pin and the length of the slot can be 1.5-2.5 times, preferably 1.7-2.0 times, the diameter of the axle pin. This allows a limited rotation of the ramp frame around its longitudinal axis according to the unevenness of the ground surface. An attainable inclination of the loading ramp with respect to the horizontal can be ±10°.

The width of each loading ramp can be 1.2-2.5 m, preferably 1.5-2.0 m. The fact that the loading ramp is able to float with loading ramps of this width creates a great advantage since a wide loading ramp, if it should bear a weight on one side in the manner of the loading ramps of the prior art, would cause a very large moment arm for forces that twist the loading ramp.

Preferably, each loading ramp has a hollow structure. The loading ramp realized with a hollow structure can be quite light relative to its size.

Preferably, the vehicle platform is a rigid, one-piece platform. The one-piece platform is level and no angles or border edges are formed in the same in the loading position for a working machine to pass over. Loading can thus be carried out safely.

Preferably, the trailer also includes a tow hitch attached to the front end of the frame for connecting the trailer to a towing vehicle.

Preferably, each axle pin is attached in a fixed, non-rotatable manner to a beam. The structure of the transverse pivot joint can thereby be very simple and robust.

Preferably, the means for operating the loading ramp is a linkage mechanism for supporting the wheels on the frame in such a manner that the vehicle platform of the trailer can be inclined relative to the wheels from a transport position substantially parallel to the ground surface to a loading position in which the rear end of the frame is closer to the ground surface than in the transport position. As a result of the movement of the vehicle platform, the loading ramp is lowered onto the ground surface into its position of use.

According to one embodiment, the linkage mechanism includes an articulated lever, wherein the first end of the articulated lever is attached in an articulated manner by an axle to the frame of the trailer while a wheel is attached in an articulated manner to the second end of the articulated lever. In addition, the linkage mechanism preferably comprises a lug formed in the articulated lever as well as an actuator which is attached in an articulated manner between the lug and the frame of the trailer in order to operate the articulated lever around an axis in order to raise and lower the rear end of the vehicle platform relative to the ground surface.

According to one embodiment, the linkage mechanism further includes swing bogies for connecting the wheels to the frame, the swing bogies being arranged on both sides of the frame of the trailer, laterally from the vehicle platform, wherein each swing bogie includes an eccentric arm comprising a front end, which is attached in an articulated manner to the frame of the trailer, and a rear end, an actuator, which is attached in an articulated manner at the cylinder end to the frame of the trailer and at the piston-rod end to the eccentric arm between the front and rear ends, a suspension arm, which is attached in an articulated manner to the rear end of the eccentric arm and which comprises two ends, wherein a wheel is mounted in bearings at each end, wherein the eccentric arm is configured so as to lower the rear end of the frame towards the ground surface while the front end substantially retains its position.

Preferably, there is a clearance of 3-20 cm, preferably 5-12 cm, parallel to the transverse pivot joint between the beams and the loading ramp arranged between them. In other words, said clearance runs in the longitudinal direction of the axle pin. This clearance allows the loading ramp to tilt without getting caught in the beams and jamming between them.

Preferably, there is a clearance between the pivot pin and the slot, in both the longitudinal and transverse directions of the slot. The clearance is intended to prevent a jamming of the pivot pin in the slot during operation. The clearance can be in the order of 3-40 mm, preferably 5-20 mm.

The trailer according to the invention is configured to transport working machines that, due to the solidity and thickness of their structures, weigh 80-500 t, preferably 120-250 t. In working machines that are this heavy, the stresses that act on the loading ramps on an uneven ground surface are extremely high.

BRIEF DESCRIPTION OF THE DRAWINGS

The invention is illustrated in the following in detail with reference to the attached drawings illustrating embodiments of the invention, wherein

FIG. 5*a* shows the cross-section H-H of FIG. 2 in a view parallel to the trailer.

DETAILED DESCRIPTION OF THE INVENTION

Figure 1A:
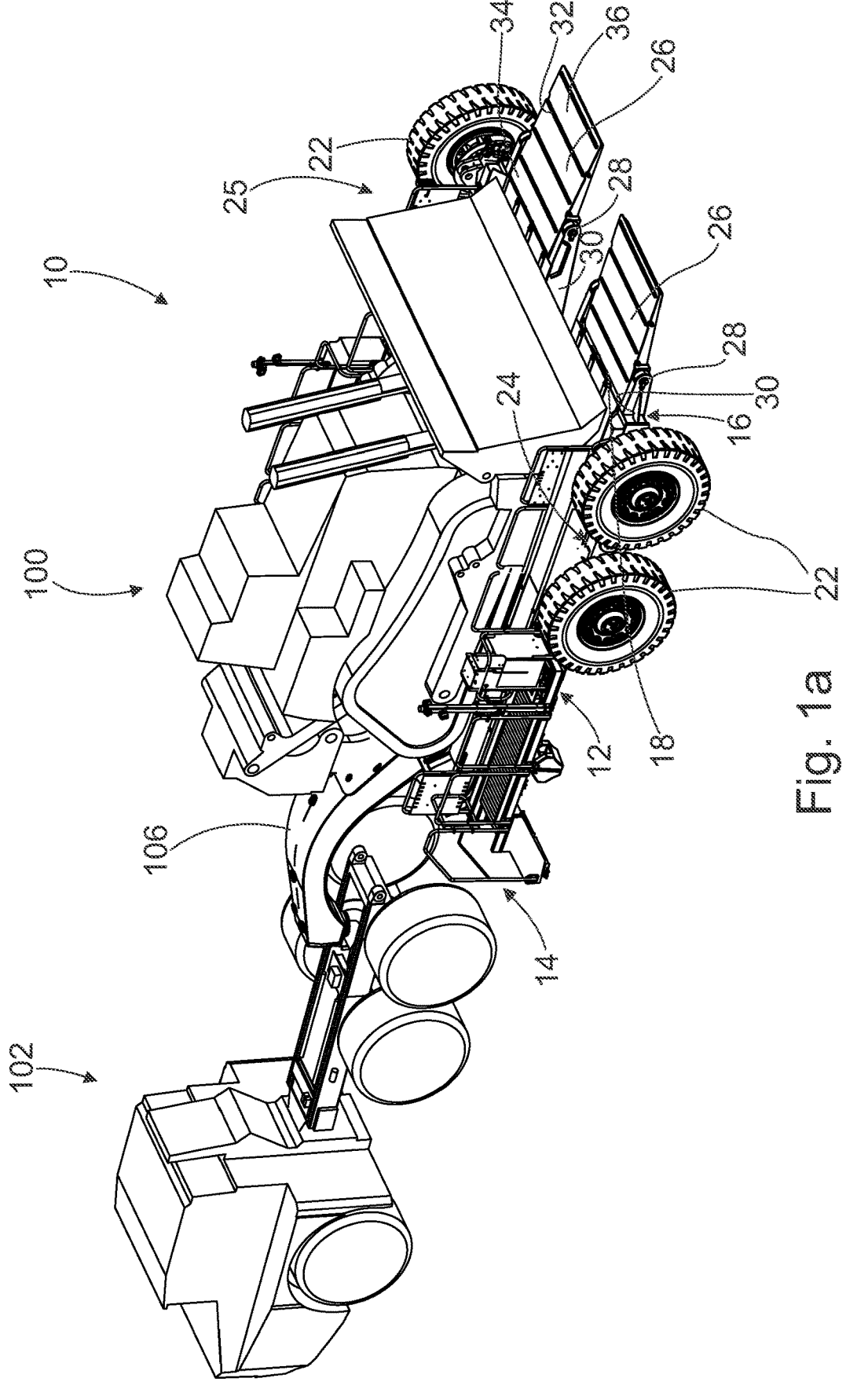
FIG. 1*a* shows an axonometric view of a trailer according to the invention joined to the rear of a towing vehicle with a working machine on the trailer.

As illustrated in FIG. 1*a*, the trailer 10 according to the invention is preferably used to transport a working machine 100 with a tracked chassis from one work site to another while being towed by a towing vehicle 102 over a ground surface 104. In order to enable the transport of the working machine on the trailer 10, a part of the trailer 10 must be brought into contact with the ground surface 104 so that loading can occur by driving the working machine. This object can be achieved by means of at least one loading ramp 26, which is lowered onto the ground surface 104 during the loading of the working machine 100. Preferably, the underside of the loading ramp 26 is substantially parallel to the ground surface and in contact with the ground surface along a length between a first end 34 and a second end 36 of the loading ramp 26. In the advantageous embodiment shown in FIGS. 1*a* and *b*, the trailer 10 comprises two loading ramps 26. It is also preferable that the structure of the trailer 10 should also allow a lowering of the vehicle platform 18 either closer to the ground surface or, most preferably, a tilting of the vehicle platform so that it is parallel to the loading ramps in the loading position. It is thus not necessary for the machine to be loaded to pass over a border edge created by diverging directions of the vehicle platform and the loading ramps, which would cause a rapid pitching of the working machine as it passes over the border edge.

Figure 1B:
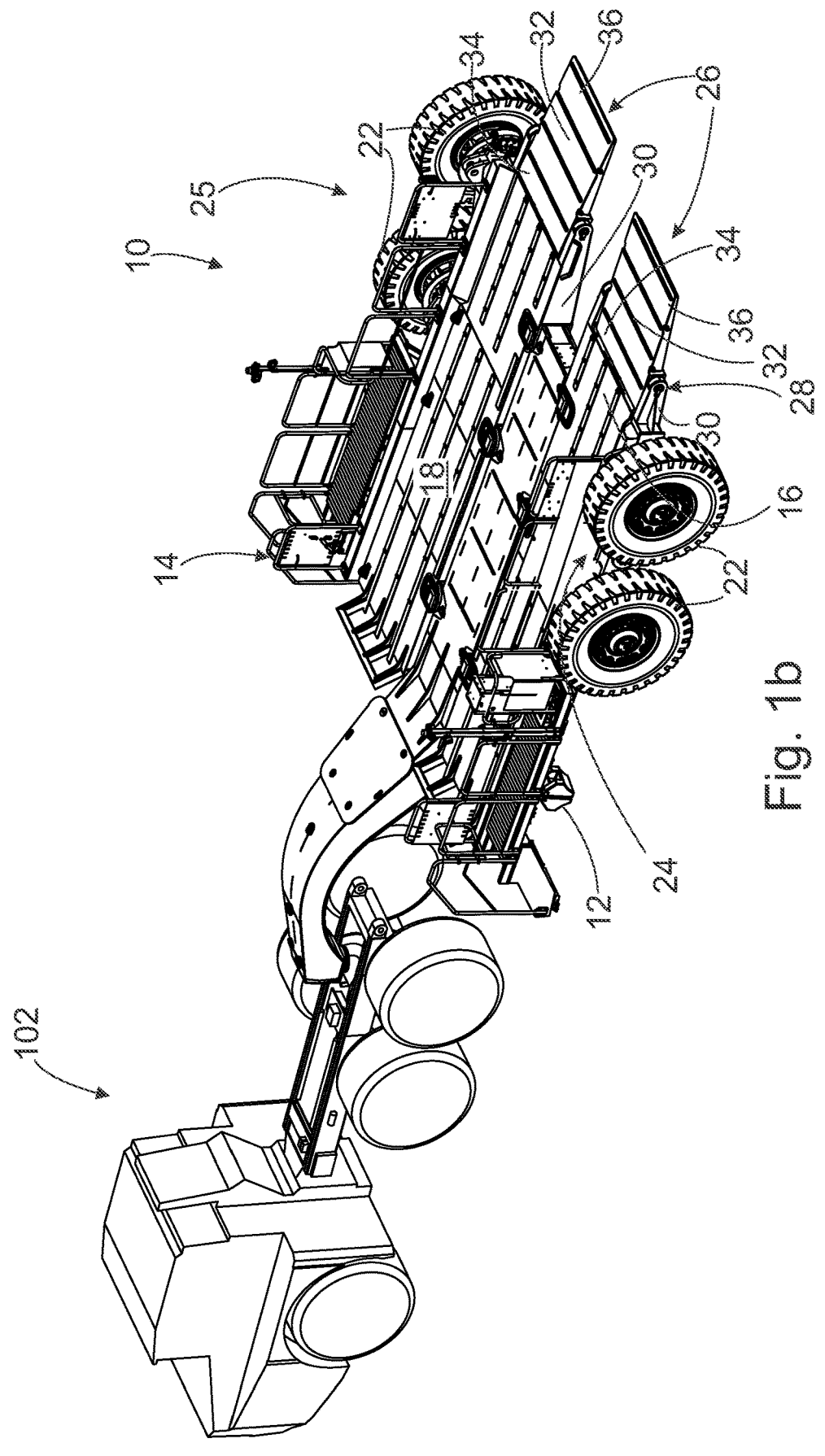
FIG. 1*b* shows an axonometric view of a trailer according to the invention joined to the rear of a towing vehicle without a working machine.
Figure 2:
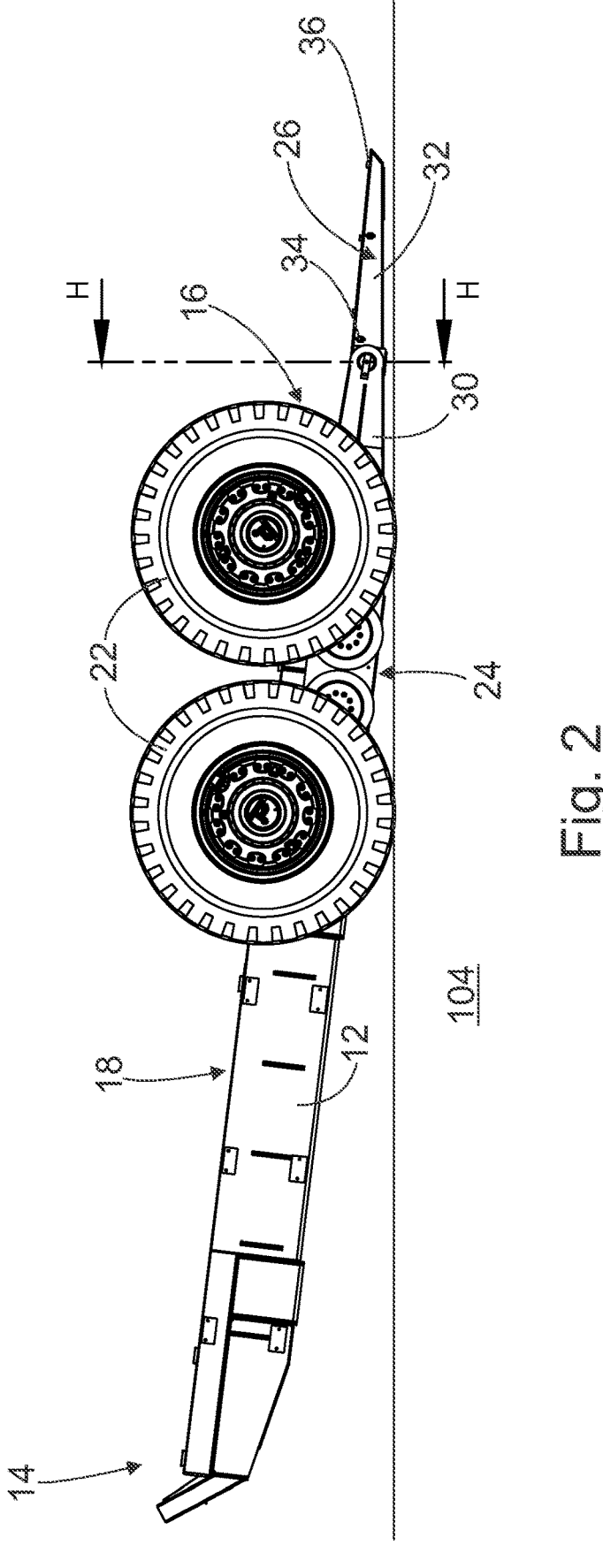
FIG. 2 shows a side view of a trailer according to the invention on its own in a loading position.

As illustrated in FIGS. 1*a*-2, which show its basic parts, the trailer 10 includes a frame 12, which has a front end 14 which comes first in the direction of travel and an opposite rear end 16 which is used for loading the working machine 100. A vehicle platform 18, on which the working machine 100 is supported, is formed on top of the frame 12. The front end 14 of the frame 12 preferably includes a tow hitch 20 for joining the trailer 10 such that it is towable by a towing vehicle 102 while the rear end 16 includes the loading ramps 26. The trailer 10 is supported on the ground surface 104 by wheels 22, which are arranged on both sides of the frame 12. Preferably, bogie wheels are used on the trailer 10 on both sides of the frame 12 in order to increase the load-bearing capacity of the trailer 10. The trailer 10 can be attached to a towing vehicle 102, for example, by means of a gooseneck tow hitch 106 which forms part of the front end 14 of the frame 12. Instead of a gooseneck tow hitch, it is also possible to use some other tow hitch suitable for the intended use.

The wheels 22 are joined to the frame by means of a linkage mechanism 24, which simultaneously also acts as a means 25 for operating the loading ramp 26. The linkage mechanism can be a linkage mechanism of a type known in the prior art such as, for example, the model Tow Haul RLD-100 or of a type described in the following and illustrated in FIGS. 7-9. The linkage mechanism of the RLD-100 model includes an articulated lever, which is attached in an articulated manner at one end by an axle to the frame of the trailer while a wheel is attached in an articulated manner to the other end of the articulated lever.

Preferably, the linkage mechanism is realized so as to allow the rear end 16 of the frame 12 and the vehicle platform 18, the loading of the working machine 100 onto the trailer 10 occurring at said rear end 16, to be lowered closer to the ground surface. The vehicle platform 18 of the trailer 10 can thus be a one-piece, level platform, whereby it is not necessary for the working machine to pass over a separate border edge during loading onto the trailer. The linkage mechanism can also include two wheels attached in an articulated manner to the same articulated lever.

Alternatively, the linkage mechanism can be realized in some other manner which brings about a lowering of the vehicle platform at the rear end of the frame towards the ground surface.

Figure 3:
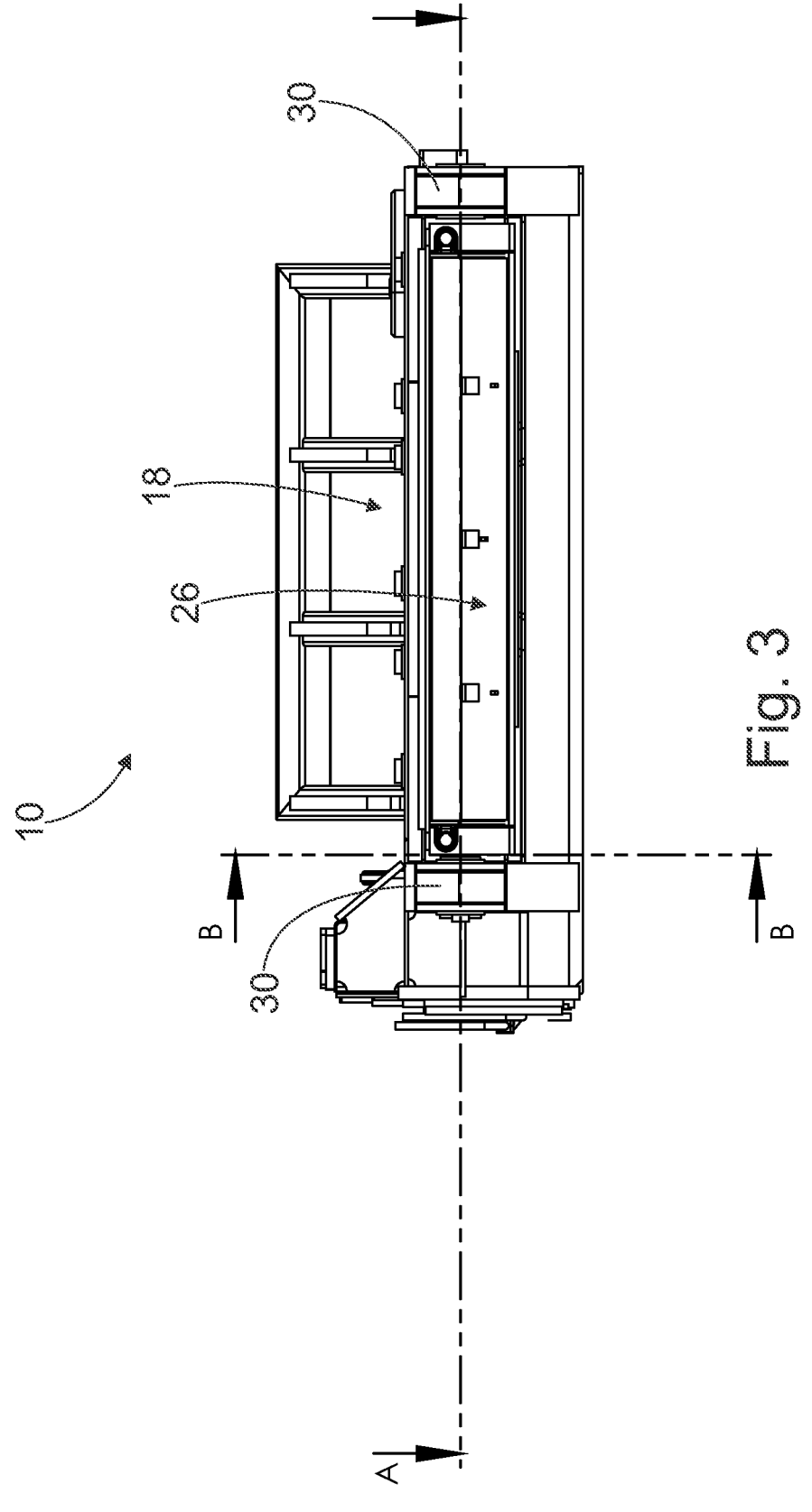
FIG. 3 shows a loading ramp on its own in a view parallel to the trailer.
Figure 4A:
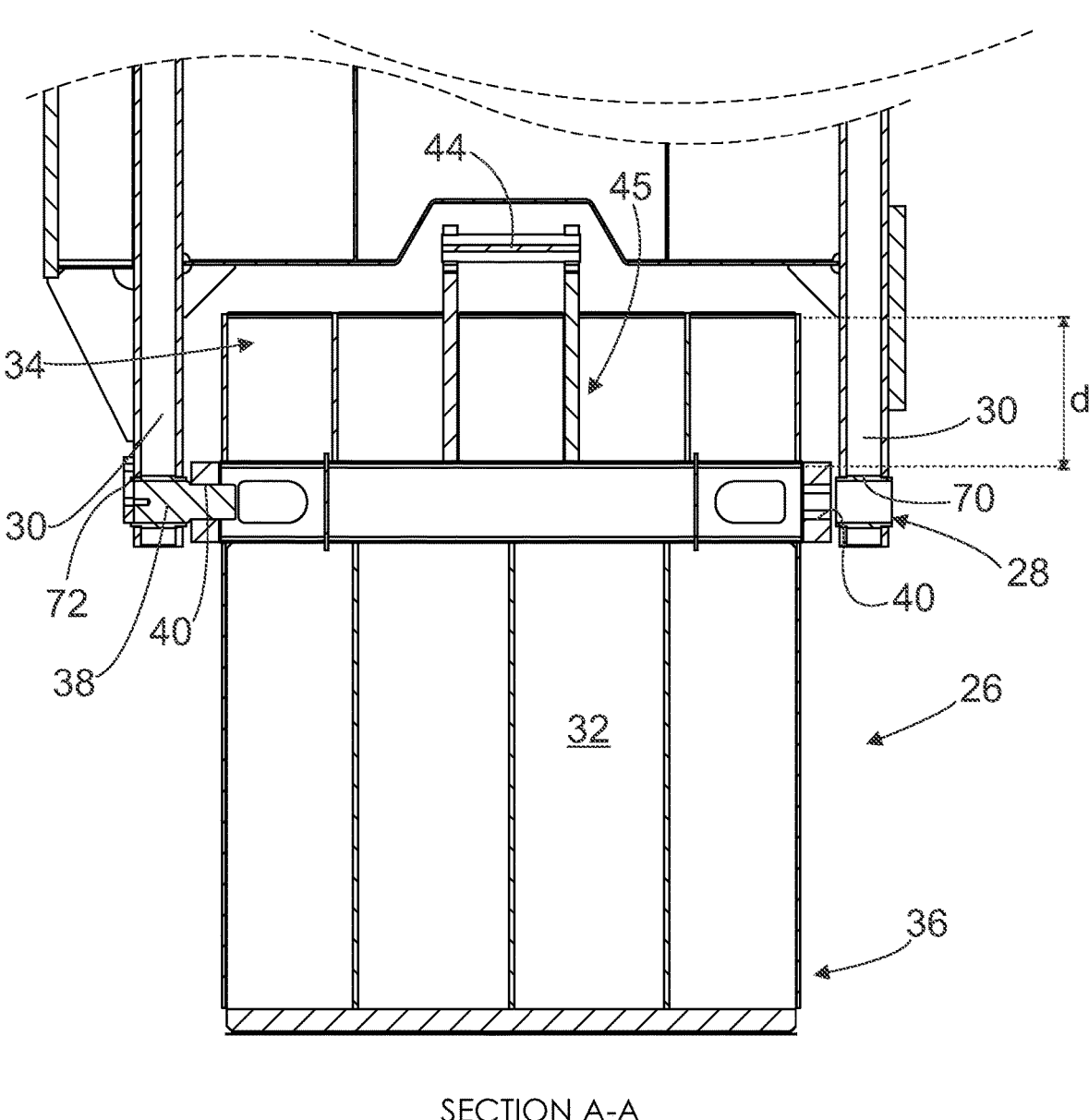
FIG. 4*a* shows the cross-section A-A of FIG. 3 in a top view.

Each loading ramp 26 is attached in an articulated manner to the frame 12 of the trailer 10 via beams 30 which form part of the rear end 16 of the frame 12, as illustrated in FIGS. 3 and 4*a*. In a trailer according to the invention, the structure of the beams can be quite lightweight since the beams are not subjected to transverse torsional forces comparable with trailers according to the prior art in which the transverse pivot joint does not permit a lateral inclination of the loading ramp. Preferably, there are two loading ramps 26 and consequently two pairs of beams 30, although FIGS. 3 and 4*a* only show one side of the trailer with a loading ramp on its own in a top view. For each loading ramp 26, there are two beams 30 at a distance from one another. This distance is 3-20 cm larger than the width of the loading ramp 26 at the point at which the loading ramp 26 is attached to the frame 12 by means of the transverse pivot joint 28 of the trailer 10. Each loading ramp 26 includes a ramp frame 32 comprising a first end 34 and a second end 36. The transverse pivot joint 28 of each loading ramp 26 in turn comprises at least one pivot pin 38 and at least one slot 40 formed in the ramp frame 32. In the preferred embodiment illustrated in FIGS. 5*a* and 5*b*, there are two pivot pins 38, wherein each pivot pin 38 extends through an opening 62 formed in one of the beams 30, as illustrated in FIG. 4 in which the second pivot pin 38 is not illustrated. Accordingly, each loading ramp preferably also includes slots 40 formed on both sides of the ramp frame 32. The slots 40 can thus be formed only in the sections of the preferably box-like loading ramp 26 which form the sides of the ramp frame 32 and, accordingly, the pivot pins 38 can be short.

Preferably, the pivot pin is a straight shaft with a circular cross-section. The pivot pin is thus simple and economical in terms of its manufacturing costs.

Alternatively, the invention could also be realized such that a slot-shaped channel runs through the cross-section of each loading ramp and a single one-piece pivot pin joined to the beams on either side of the loading ramp is arranged in said channel. Such a structure is, however, heavier and more expensive to manufacture even if it would likewise provide the technical advantage of a limited potential for the loading ramp to tilt about its longitudinal axis on an uneven ground surface.

The pivot pins 38 can be fixed in the openings 70 of the beams 30 by means of separate locking members 72, as illustrated in FIG. 4*a*. The locking members 72 can be, for example, an iron plate connected by a bolt to both the beam 30 and the pivot pin 38, which prevents a rotation of the pivot pin 38 in the opening 70 as well as a longitudinal movement of the pivot pin 38 in the opening 70 and slot 40.

Figure 4B:
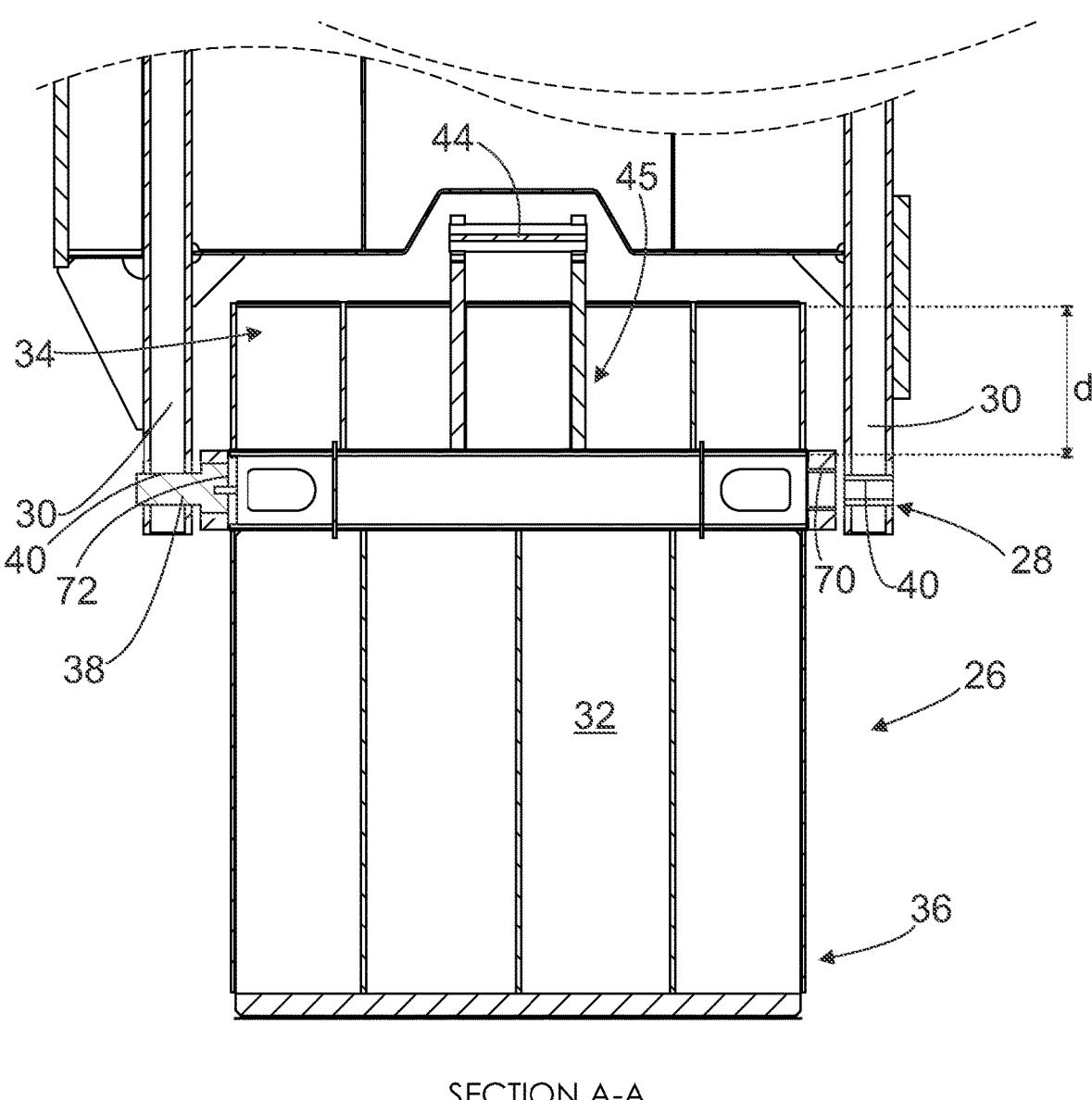
FIG. 4*b* shows an, with respect to FIG. 4*a*, alternative realization of the cross-section A-A of FIG. 3.
Figure 5B:
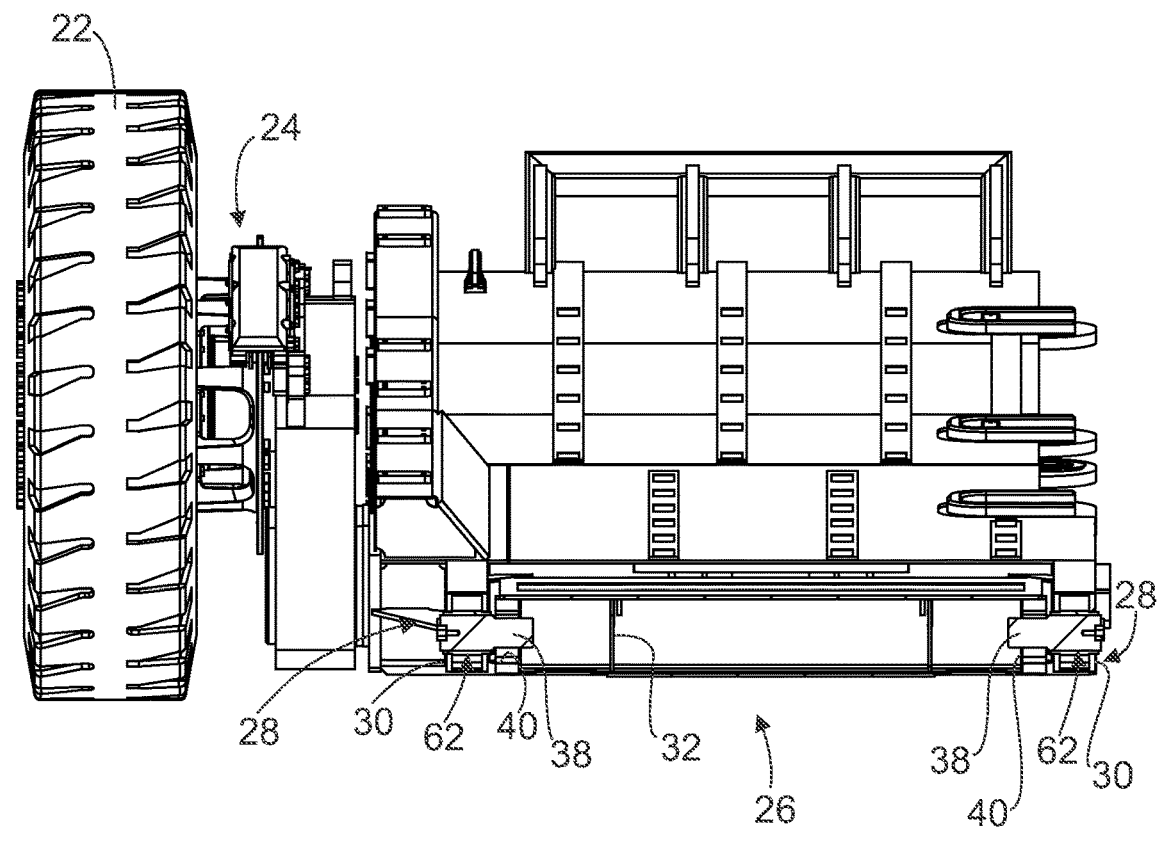
FIG. 5*b* shows the cross-section of FIG. 5*a* in a situation in which the loading ramp is inclined.
Figure 5B:
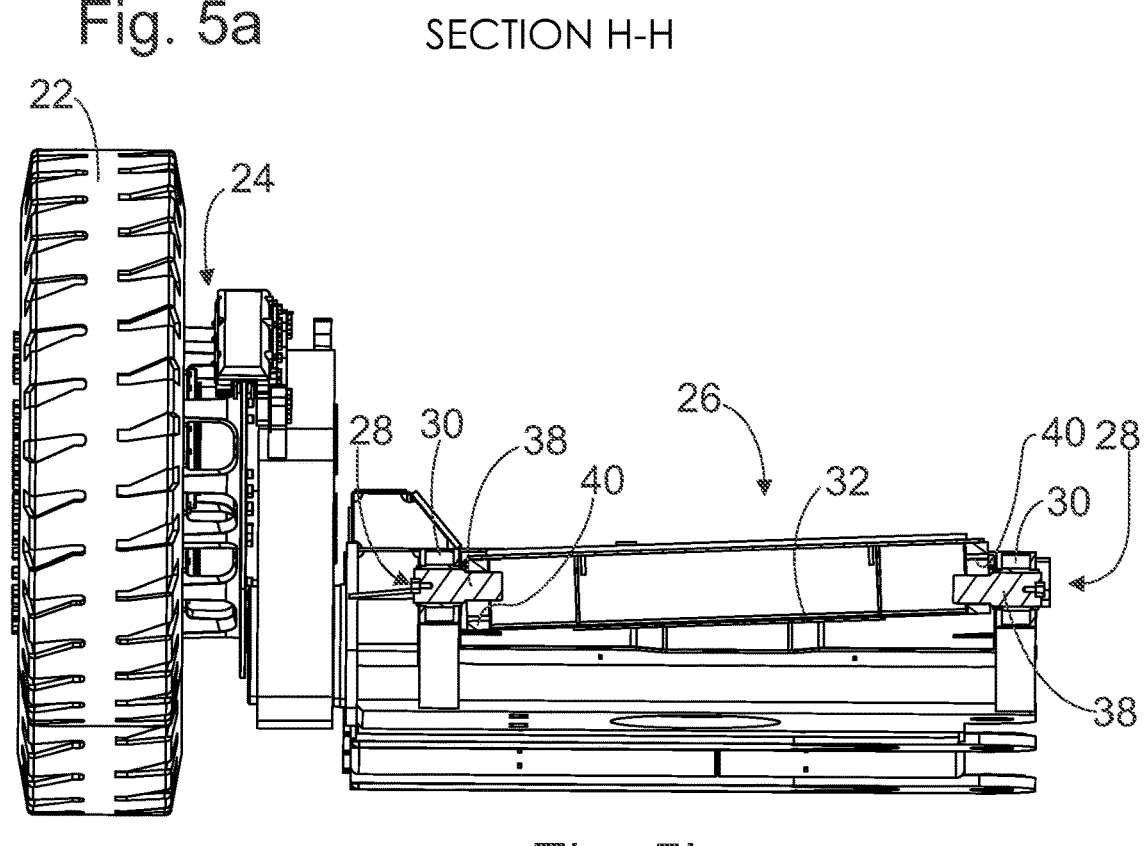

In an alternative embodiment illustrated in FIG. 4*b*, the slots 40 can be formed in the beams 30 and the pivot pins 38 can be connected to the ramp frame 32 by means of the locking members 72.

As the number of times the loading ramps are raised and lowered in a single day is relatively small, being merely twice the number of transportation events, the transverse pivot joint 28 can be mounted without bearings. The pivot pin can be made of a material that is weaker than the material of the loading ramp, whereby it gradually wears out. The pivot pin can be made of nitrided steel in order to improve its durability. The pivot pin can be replaced with a new one at fixed intervals.

Figure 6A:
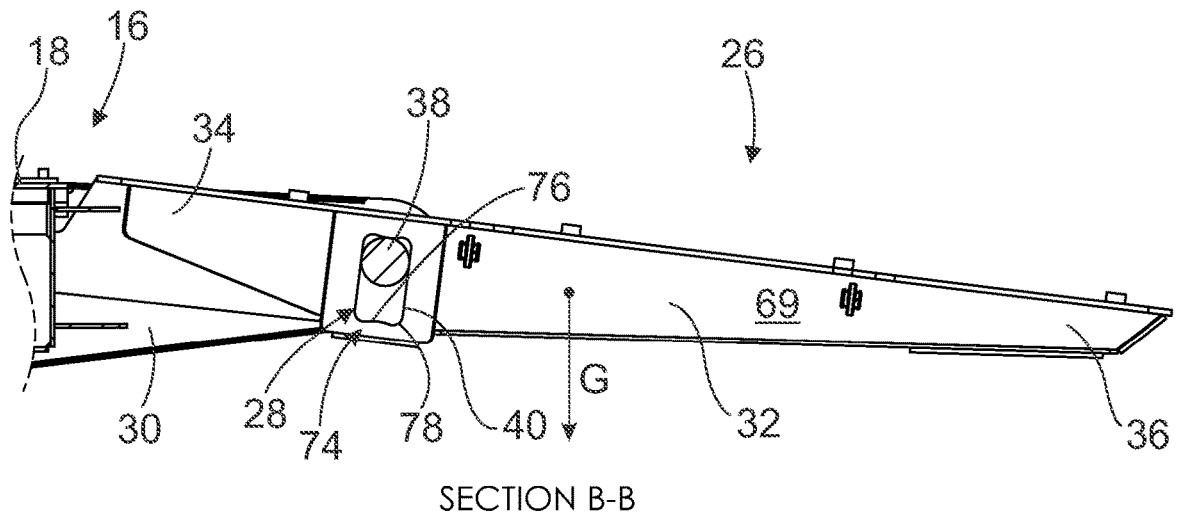
FIG. 6*a* shows the cross-section B-B of FIG. 3 in a transport position of the loading ramp.
Figure 6B:
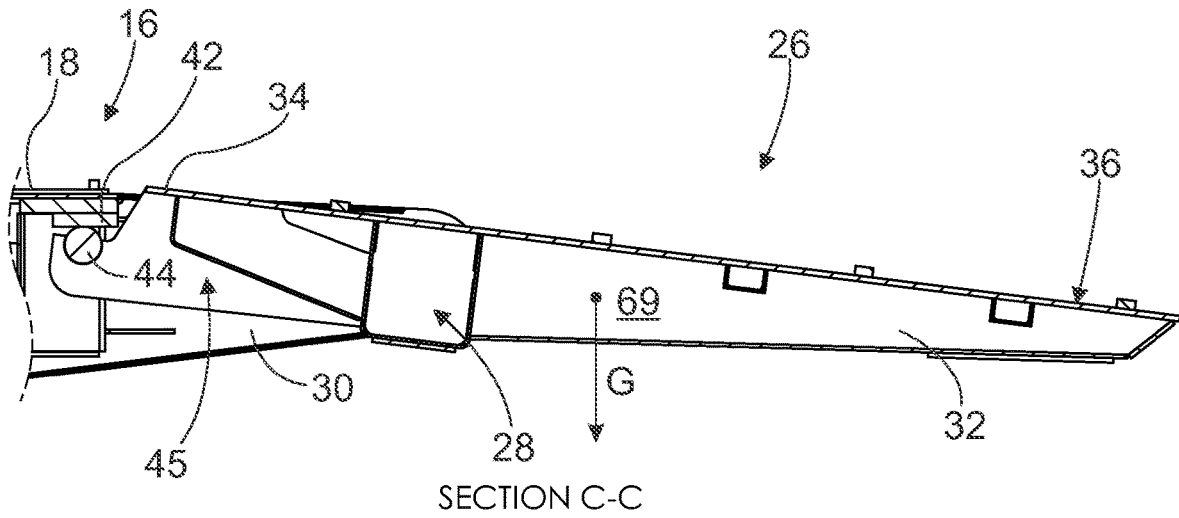
FIG. 6*b* shows the cross-section C-C of FIG. 3 in a transport position of the loading ramp.

The structure of the slot 40 is illustrated in more detail in FIGS. 6*a* and 6*b*. Each slot 40 can be 5-20 mm wider than the diameter of the pivot pin 38 while the length of the slot can be 1.5-2.5 times, preferably 1.7-2.0 times, longer than the diameter of the pivot pin 38. The loading ramp 26 is thereby able to tilt±10 around the longitudinal axis of the loading ramp 26 from the straight position of FIG. 5*a* to the fully tilted position illustrated in FIG. 5*b*. In order to prevent the loading ramp 26 from jamming between the beams 30, a clearance is provided between the loading ramp 26 and the fork formed by the beams 30.

The ends 74 of the slot 40 are formed by inwardly convex sections 76 so as to prevent dirt accumulating at the ends of the slot 40 from being pressed into the corners 78 of the slot 40 and causing a jamming of the transverse pivot joint 28. The side surfaces that join the ends of the slot are preferably straight, whereby the slot is simple to manufacture and reliable in operation.

Figure 6C:
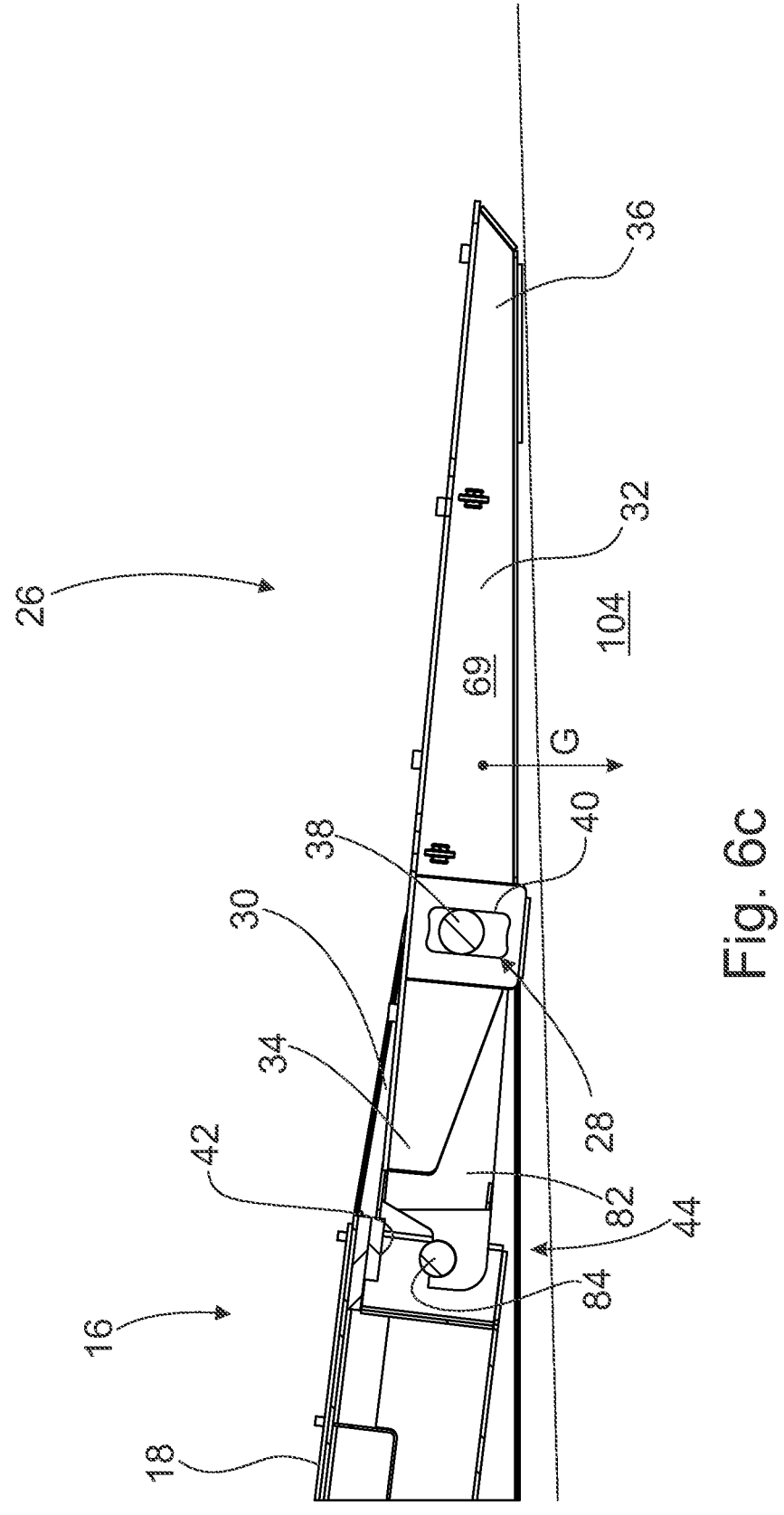
FIG. 6*c* shows the cross-section according to FIG. 6*a* in a situation in which the loading ramp is in a loading position.

Like the trailer 10, the loading ramp 26 has two positions, the transport position illustrated in FIGS. 6*a* and 6*b*, in which the loading ramp 26 is substantially parallel to the vehicle platform 18, i.e. horizontal, and the transport position illustrated in FIG. 6*c*, in which the second end 36 of the loading ramp 26 is on the ground surface for the transfer of the working machine onto the vehicle platform 18. In the transport position, the second end 36 of the loading ramp 26 is off the ground surface. In the trailer 10 according to the invention, the transfer of the loading ramp or ramps 26 between the transport position and the loading position occurs by the force of gravity according to the movements of the frame 12 of the trailer 10. In other words, there is no separate actuator between the frame and the loading ramp for actuating the loading ramp or ramps. This mode of actuation based on the force of gravity is achieved by arranging the transverse pivot joint 28 in the ramp frame 32 between the first end 34 and the second end 36 at a distance d from the first end 34, as illustrated in FIG. 4*a*. The distance d is 10-40%, preferably 20-30%, of the length of the ramp frame 32. The centre of gravity of the ramp frame 32 is thus located somewhere along the length of the ramp frame 32 between the transverse pivot joint 28 and the second end 36, whereby the loading ramp 26 pivots by the force of gravity into the transport position when the vehicle platform is raised by means of the linkage mechanism into the horizontal and the second end 36 of the loading ramp 26 disengages from the ground surface 104.

In the transport position, the centre of gravity G of the loading ramp 26 tends to rotate the loading ramp 26 around the transverse pivot joint 28, whereby the loading ramp would end up in a vertical position if it rotated freely. The second end 36 of the loading ramp 26 would thus drag on the ground surface 104. In order to prevent this, the trailer 10 includes a support surface 42, which in the preferred embodiment of FIGS. 1*a*-6*c* is formed on the underside 67 of the vehicle platform 18, as illustrated in FIG. 6*b*. Preferably, the loading ramp 26 also includes a limiting member 44 formed at the first end 34 of the loading ramp 26, which protrudes beyond the first end 34 of the loading ramp 26 further in the direction of the rear end 16 of the frame 12 of the trailer 10. The ramp frame 32 can thus be shorter than in a realization in which the first end of the ramp frame was in contact with the underside of the vehicle platform. The limiting member 44 can be, for example, be a transverse rod 84 joined to the ends of brackets 82, the transverse rod 84 resting against the support surface 42 in the transport position of the loading ramp. The support surface 42 can be made of, for example, wear-resistant steel. Preferably, the support surface 42 is formed by a plate or plates bolted to the rear end 16 of the frame 12 underneath the vehicle platform 18, wherein it is possible to vary the distance of the second end 36 of the ramp from the ground surface 104 when the trailer 10 is in the transport position by varying the number of plates.

The dimensions of the trailer according to the invention strongly depend on the weight of the working machine to be transported. In cases where a 120-tonne working machine is to be transported with the trailer, the wheels used on the trailer must have a diameter of at least 1.6 m. The trailer can be 10-25 m long, preferably 15-20 m long, and 4-12 m wide, preferably 6-10 m wide. Each loading ramp can be made of, for example, 10-30 mm steel plate. The structure of the loading ramp 26 can take the form of a hollow structure consisting of plate sections, as illustrated in FIGS. 3-6*c*. Preferably, the loading ramp is formed by laser welding, whereby the implemented welds can be long, which results in a loading ramp structure that is lightweight while simultaneously exhibiting—due to its box-like structure—a high torsional rigidity.

The slot 40 of the transverse pivot joint 28 of the loading ramp 26 is preferably formed in a high-strength steel section welded to the ramp frame 32 of the loading ramp 26 or joined in some other manner so as to be substantially non-deformable, said steel section being made of, for example, 20-120 mm, preferably 60 to 100 mm, steel plate. The width of the slot can be 100-200 mm while its height can be 150-300 mm. Accordingly, the diameter of the pivot pin essentially corresponds to the width of the slot.

Although FIGS. 1*a*-6*c* illustrate a trailer 10 according to the invention realized with two loading ramps 26, it is understood that the tilting structure of the loading ramp according to the invention can also be utilized in realizations of the trailer in which there is only one wide loading ramp attached in an articulated manner by means of a single transverse pivot joint to the rear end of the trailer.

Figure 7:
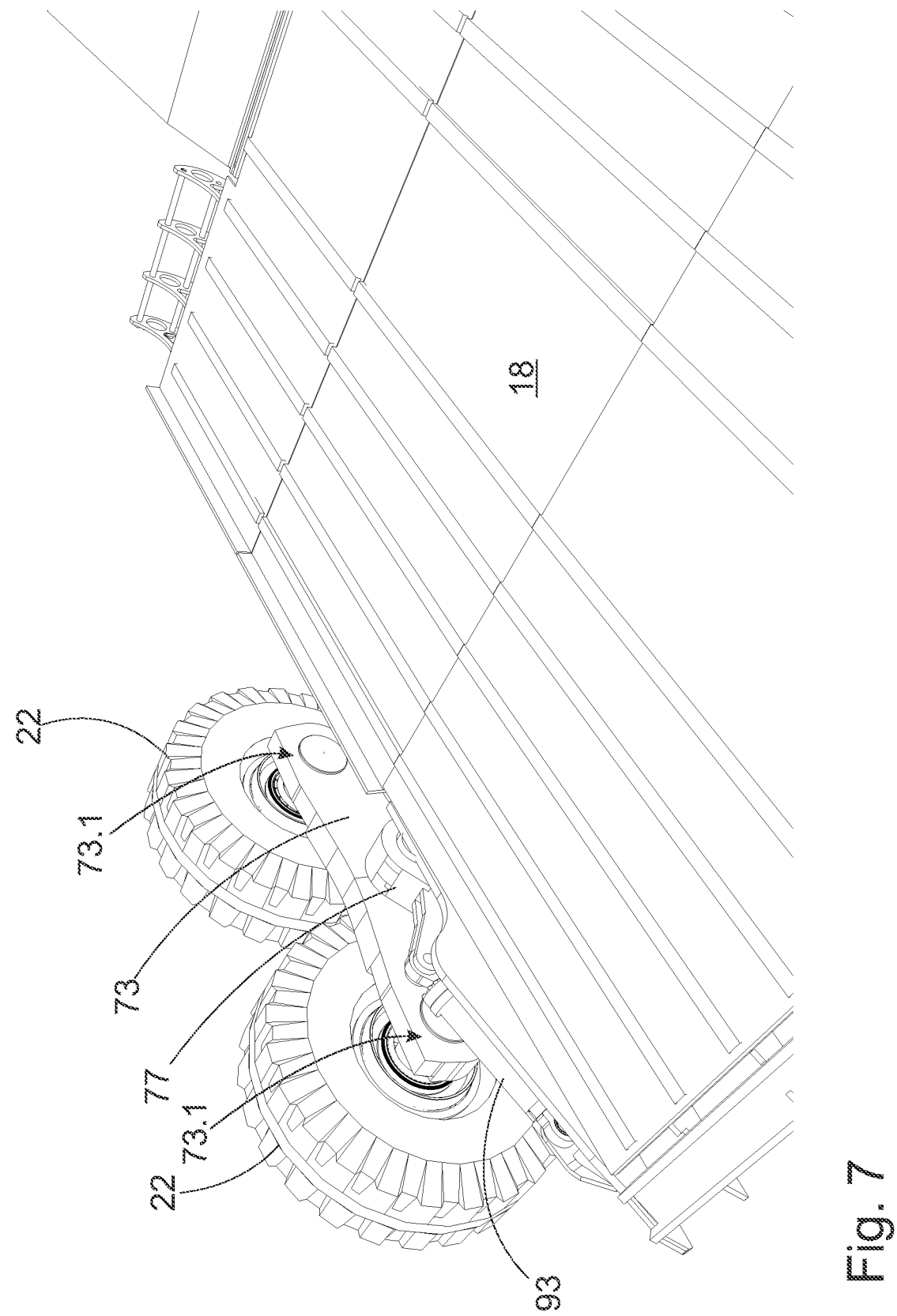
FIG. 7 shows an axonometric view of a linkage mechanism which can tilt the vehicle platform of the trailer, with the vehicle platform in a transportation position.
Figure 8:
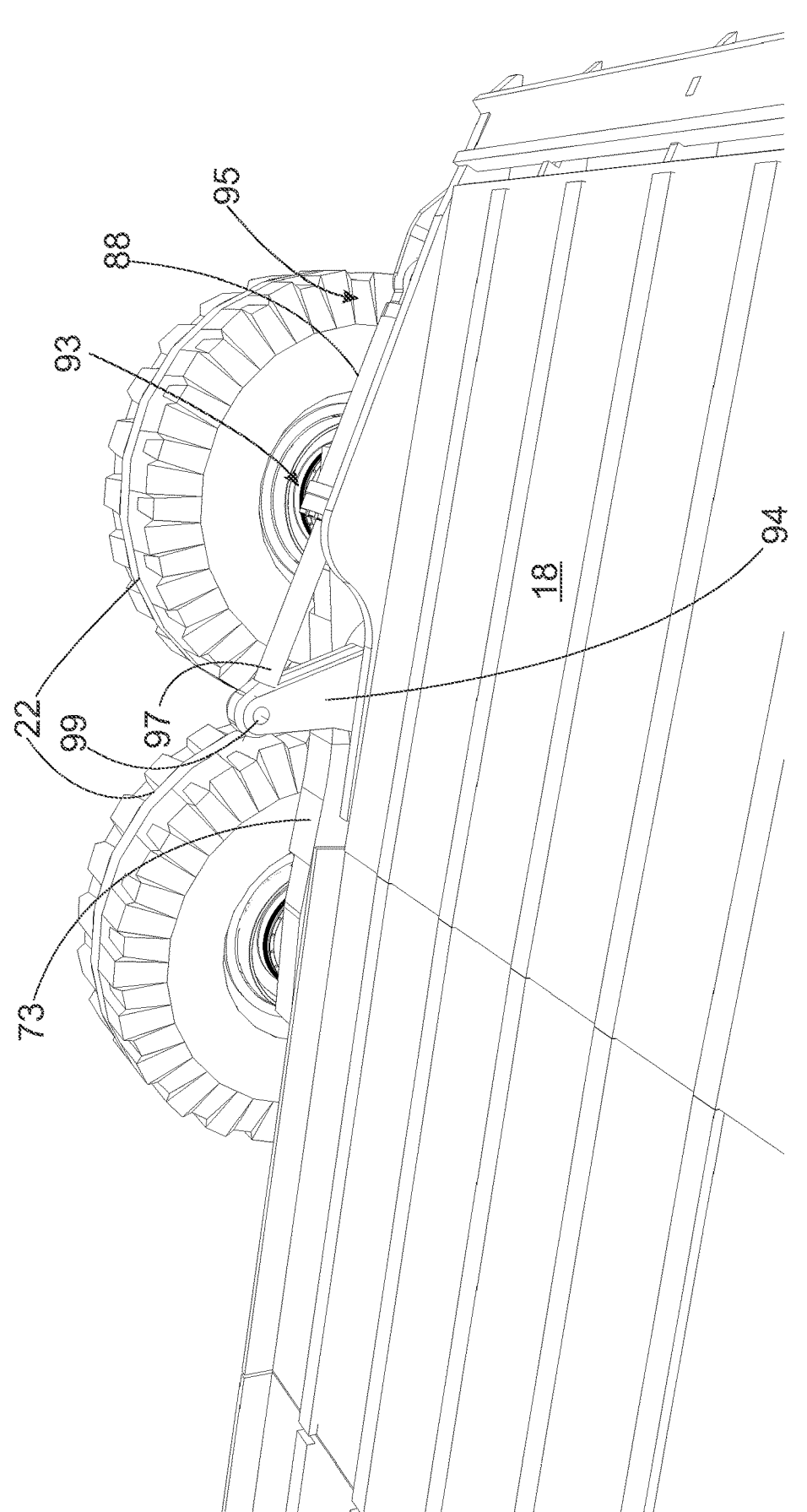
FIG. 8 shows an axonometric view of a linkage mechanism which can tilt the vehicle platform of the trailer, with the vehicle platform in a loading position.
Figure 9:
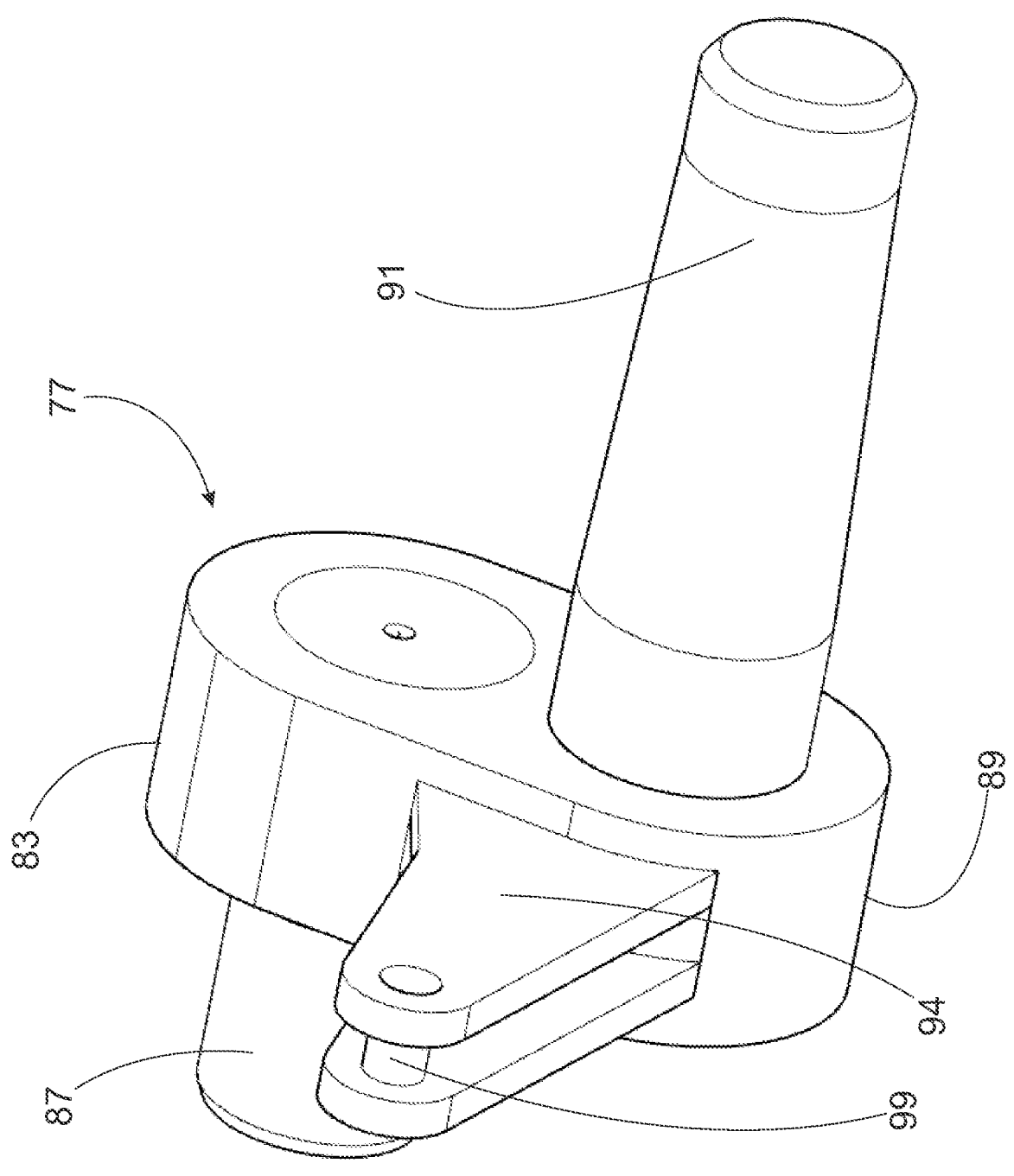
FIG. 9 shows an eccentric arm on its own.

FIGS. 7-9 illustrate a mode of realization of how the vehicle platform 18 of the trailer 10 can be tilted by its rear end 16 onto the ground surface for the loading of a working machine. A simplified illustration of the vehicle platform 18 is shown in FIGS. 7-9 without the railing structures shown in FIGS. 1a and 1b. The linkage mechanism 24 is realized as a swing bogie 75 here, in which an eccentric arm 77 visible in FIGS. 7-9 is used, which is mounted in bearings at its front end 83 to the frame 12 of the trailer 10 by means of an axle pin 87. A suspension arm 73 is in turn mounted in bearings on the rear end 89 of the eccentric arm 77 by means of a second axle pin 91. The eccentric arm 77 is operated by means of an actuator 93, which is in turn attached in an articulated manner by its cylinder head 95 to the frame 12 of the trailer 10 and by its piston-rod end 97 to a point of articulation 99 formed in a bracket 94 between the first end 83 and the second end 87 of the eccentric arm 77. The driving force for tilting the vehicle platform can preferably be obtained from the towing vehicle.

The structure of the linkage mechanism can also be different from what is illustrated in FIGS. 7-9, while keeping in mind that the structure must be suitable for tilting a rigid vehicle platform so as to bring the rear end of the vehicle platform into contact with or at least close to the ground surface.

Instead of swing bogies, realizations of smaller-capacity trailers can have only one wheel on each side of the trailer, which is mounted in bearings directly onto the end of the eccentric arm instead of on a swing bogie.

The invention claimed is:

1. A trailer, comprising:
a trailer frame comprising a front end, a rear end, and a vehicle platform for supporting a working machine to be transported on the trailer frame;
wheels for supporting the trailer on a ground surface;
at least one beam extending from the rear end of the trailer frame;
at least one loading ramp including a ramp frame having a first end and a second end, the first end having an articulated connection to the rear end of the trailer frame, each loading ramp being arranged to rest on the ground surface in a loading position thereby enabling movement of the working machine onto the vehicle platform, wherein the articulated connection comprises a transverse pivot joint between the at least one loading ramp and the rear end of the trailer frame, the transverse pivot joint including at least one pivot pin and at least one slot;
a support surface located at the rear end of the trailer frame formed underneath the vehicle platform or underneath at the least one beam, wherein the first end of each ramp frame rests against the support surface to limit a rotation of the ramp frame and to support the second end of the loading ramp off the ground surface in a transport position;
a limiting member included in the first end of the ramp frame and being arranged to rest against the support surface of the trailer frame to limit a rotation around the transverse pivot joint of the loading ramp;
wherein the transverse pivot joint is formed in the ramp frame between the first and second ends of the ramp at a distance from the first end of 10-40% of a length of the ramp frame;

wherein the at least one pivot pin and the at least one slot allow a limited inclination of each loading ramp about a longitudinal axis between the first end and the second end of the ramp frame; and
wherein the pivot pin is formed in one of the at least one ramp frame and the rear end of the trailer frame and the slot is formed in the other of the at least one ramp frame and the rear end of the trailer frame.

2. The trailer according to claim 1, wherein the at least one beam includes at least two beams to which the at least one loading ramp is attached by the transverse pivot joint.

3. The trailer according to claim 2, wherein the at least two beams includes four beams, and the at least one loading ramp comprises two loading ramps each of which is arranged between two of the at least four beams.

4. The trailer according to claim 2, wherein each transverse pivot joint includes:
two pivot pins, each of which is respectively attached to one of the two beams; and
two slots formed in the ramp frame.

5. The trailer according to claim 1, wherein a centre of gravity of each loading ramp is located in a part of the loading ramp on a side of the second end of the ramp frame relative to the transverse pivot joint.

6. The trailer according to claim 1, wherein a width of the slot is 3-40 mm larger than a diameter of the pivot pin and length of the slot is 1.5-2.5 times a diameter of the pivot pin.

7. The trailer according to claim 1, wherein a width of each loading ramp is 1.2-2.5 m.

8. The trailer according to claim 3, wherein each pivot pin is attached in a fixed, non-rotatable manner to one of the beams.

9. The trailer according to claim 1, further including equipment for operating the loading ramp that includes a linkage mechanism for supporting the wheels on the trailer frame so that the vehicle platform of the trailer is inclinable relative to the wheels from a transport position substantially parallel to the ground surface to a loading position in which the rear end of the frame is closer to the ground surface than in the transport position.

10. The trailer according to claim 9, wherein the linkage mechanism includes swing bogies for connecting the wheels to the trailer frame, the swing bogies being arranged on both sides of the trailer frame, laterally of the vehicle platform, wherein each swing bogie includes:
an eccentric arm comprising an arm front end attached in an articulated manner to the trailer frame, and an arm rear end;
an actuator having a cylinder end and a piston rod end, the actuator being attached in an articulated manner at the cylinder end to the trailer frame and at the piston-rod end to the eccentric arm between the arm front end and the arm rear end; and
a suspension arm attached in an articulated manner to the arm rear end of the eccentric arm and which comprises two suspension arm ends, wherein a wheel is mounted in bearings at each suspension arm end;
wherein the eccentric arm is configured to lower the rear end of the trailer frame towards the ground surface while the front end substantially retains its position.

11. The trailer according to claim 1, wherein the trailer has a clearance of 3-20 cm parallel to the transverse pivot joint between the beams and the loading ramp arranged between the beams.

* * * * *